United States Patent
Bishop et al.

(10) Patent No.: US 8,098,190 B2
(45) Date of Patent: Jan. 17, 2012

(54) APPARATUS AND METHOD FOR TESTING EMERGENCY LOCATOR BEACONS

(75) Inventors: Ronald D. Bishop, Trabucco Canyon, CA (US); Gordon W. Johnston, Ontario (CA); Christopher P. Hoffman, Hampshire (GB); Scott P. Morgan, Northfield, VT (US)

(73) Assignee: ACR Electronics, Inc., Fort Lauderdale, FL (US)

( * ) Notice: Subject to any disclaimer, the term of this patent is extended or adjusted under 35 U.S.C. 154(b) by 314 days.

(21) Appl. No.: 12/553,488

(22) Filed: Sep. 3, 2009

(65) Prior Publication Data
US 2010/0103042 A1 Apr. 29, 2010

Related U.S. Application Data

(60) Provisional application No. 61/108,043, filed on Oct. 24, 2008.

(51) Int. Cl.
| | |
|---|---|
| *G01S 13/74* | (2006.01) |
| *G01S 13/00* | (2006.01) |
| *G01S 1/00* | (2006.01) |
| *G01S 1/08* | (2006.01) |
| *G08B 1/08* | (2006.01) |
| *H04M 11/04* | (2006.01) |

(52) U.S. Cl. .............. 342/60; 342/42; 342/44; 342/385; 342/386; 340/539.13; 340/539.32; 455/404.2

(58) Field of Classification Search .......... 342/42, 342/44, 45, 60, 175, 357.07, 357.09, 357.1; 340/539.13, 539.32; 455/404.2
See application file for complete search history.

(56) References Cited

U.S. PATENT DOCUMENTS

| | | | | |
|---|---|---|---|---|
| 5,519,403 | A * | 5/1996 | Bickley et al. | 342/352 |
| 5,724,045 | A * | 3/1998 | Kawakami | 342/357.55 |
| 5,838,237 | A * | 11/1998 | Revell et al. | 340/573.1 |
| 5,852,401 | A * | 12/1998 | Kita | 340/539.13 |
| 5,982,322 | A * | 11/1999 | Bickley et al. | 342/357.59 |
| 6,275,164 | B1 * | 8/2001 | MacConnell et al. | 340/692 |
| 6,362,778 | B2 * | 3/2002 | Neher | 342/357.75 |
| 6,771,163 | B2 * | 8/2004 | Linnett et al. | 340/309.5 |
| 7,038,590 | B2 * | 5/2006 | Hoffman et al. | 340/573.1 |
| 7,053,822 | B2 * | 5/2006 | Rickerson, Jr. | 342/357.54 |
| 7,215,282 | B2 * | 5/2007 | Boling et al. | 342/357.31 |
| 7,221,928 | B2 * | 5/2007 | Laird et al. | 455/404.1 |
| 7,830,305 | B2 * | 11/2010 | Boling et al. | 342/357.55 |
| 2002/0118796 | A1 * | 8/2002 | Menard et al. | 379/45 |
| 2004/0140928 | A1 * | 7/2004 | Cleghorn | 342/357.07 |
| 2005/0143049 | A1 * | 6/2005 | Hoke, Jr. | 455/404.2 |
| 2006/0148423 | A1 * | 7/2006 | Sharpe | 455/90.1 |
| 2008/0191863 | A1 * | 8/2008 | Boling et al. | 340/521 |
| 2008/0261556 | A1 * | 10/2008 | McLellan | 455/404.2 |
| 2009/0224966 | A1 * | 9/2009 | Boling et al. | 342/357.1 |
| 2010/0103042 | A1 * | 4/2010 | Bishop et al. | 342/357.16 |

* cited by examiner

*Primary Examiner* — Thomas Tarcza
*Assistant Examiner* — Peter Bythrow
(74) *Attorney, Agent, or Firm* — Malin Haley DiMaggio Bowen & Lhota, P.A.

(57) ABSTRACT

An emergency locator beacon testing and communication system is described. The system uses privately-owned Local User Terminals which provide direct feeds to a privately-operated beacon information processor having dedicated on-line servers for consolidating and providing access to beacon test information. The system receives beacon signals relayed through the Cospas-Sarsat satellite system, correlates the beacons' unique identification numbers (UIN's) in the received signals to the UIN's of beacons known to be undergoing testing, collects the data transmitted by beacons under test, and displays beacon test results in a useful format on a user-friendly website.

34 Claims, 4 Drawing Sheets

APPARATUS AND METHOD FOR TESTING EMERGENCY LOCATOR BEACONS

This application claims priority to provisional patent application Ser. No. 61/108,043 filed Oct. 24, 2008, titled "Apparatus and Method For Testing Emergency Locator Beacons," the entire contents of which are incorporated herein by reference.

FIELD

This invention relates to systems for testing emergency locator beacons to confirm proper operation of same.

BACKGROUND

As the phrase is used herein, "emergency locator beacon" generally refers to commercial, military, and general aviation Emergency Locator Transmitters (ELTs), consumer and military Personal Locator Beacons (PLBs), and maritime Emergency Position-Indicating Radio Beacons (EPIRBs), including those operating in the international 406 MHz Cospas-Sarsat system. All of these devices need occasional testing to verify proper operation. In fact, the U.S. Coast Guard has rules requiring the mandatory testing of EPIRB's on a monthly basis.

Currently, there are four main groups offering beacon testing services: TSI, Inc. (a manufacturer of Local User Terminals (LUTs)), government entities such as the U.S. Coast Guard and the Canadian government, various entities using beacon testing equipment manufactured by A.R.G. ElectroDesign Ltd./Sartech Engineering Ltd. and WS Technologies, Inc., and a number of small test shops/manufacturers to which a beacon owner must return a beacon unit for testing. Of these groups, only TSI, Inc. and the Canadian government provide "over the air" (OTA) testing, that is, testing to verify that the beacon unit is properly transmitting a signal when activated.

Up to now, Federal Communications Commission (FCC) regulations have limited consumer testing of emergency locator beacons to self-testing (internal integrity testing) or to the use of a beacon tester. "Live" testing through the Cospas-Sarsat satellite system has been strictly prohibited.

What is needed, therefore, is a comprehensive way to test emergency locator beacons which includes local testing and an OTA test through the Cospas-Sarsat satellite system.

SUMMARY

Preferred embodiments of the invention provide systems for testing emergency locator beacons preferably using privately-owned local user terminals (LUTs). These LUTs provide direct feeds to a privately-operated beacon information processor having dedicated on-line servers for consolidating and providing access to beacon test information. Proprietary software decodes the data provided by the LUTs, stores it in a database, and displays it on a user-friendly website. As described in more detail hereafter, embodiments of the invention are operable to receive beacon signals relayed through the Cospas-Sarsat satellite system, correlate the unique identification numbers (UIN's) in those received signals to the UINs of beacons known to be undergoing testing, collecting the data transmitted by beacons under test, and displaying beacon test results in a useful format on a user-friendly website.

Some embodiments utilize two different forms of real-time testing procedures: (1) Over The Air (OTA) testing through the Cospas-Sarsat satellite network; and (2) local testing using a close-proximity beacon tester and associated software programs running on a personal computer connected to the beacon tester. This combination of local testing and total OTA Cospas-Sarsat system testing is particularly well suited for use in FAA-approved aviation repair facilities, by aircraft manufacturers, by commercial shipping inspectors, in large marinas, in retail and rental locations, and any other facility that manages emergency locator beacons.

In one aspect, the invention provides a system for testing an emergency locator beacon to verify proper operation and for providing test results. Preferred embodiments of the system include a database, one or more local user terminals (LUTs), a beacon information processor in communication with the local user terminals and the database, and a communication network. The database stores beacon registration information which includes a beacon identification number associated with the emergency locator beacon and user contact information associated with a designated user of the emergency locator beacon. The LUTs receive a radio-frequency transmission which includes a beacon identification number from an emergency locator beacon via a satellite network. The beacon information processor extracts the beacon identification number from the radio-frequency transmission, searches the database to find beacon registration information associated with the extracted beacon identification number, determines characteristics of the radio-frequency transmission indicative of the operational status of the emergency locator beacon that generated the transmission, and generates a test report based on the characteristics determined. The communication network communicates the test report to the user.

In some embodiments, the database also stores a time slot allocated for testing the emergency locator beacon, and the local user terminals receive the radio-frequency transmission from the emergency locator beacon via the satellite network during the allocated time slot.

In another aspect, the invention provides methods for communicating information using an emergency locator beacon. In one preferred embodiment, a method includes the following steps:

(a) receiving beacon registration information via a communication network, where the beacon registration information includes a beacon identification number associated with the emergency locator beacon and contact information associated with an entity designated to receive beacon information;

(b) storing the beacon registration information in a database;

(c) receiving a radio-frequency transmission from an emergency locator beacon via a satellite network, where the radio-frequency transmission includes a beacon identification number;

(d) extracting the beacon identification number from the radio-frequency transmission;

(e) searching the database to find beacon registration information associated with the beacon identification number extracted from the radio-frequency transmission;

(f) generating a report message for the entity designated to receive beacon information, the report message including beacon information obtained from the radio-frequency transmission; and (g) communicating the report message via the communication network to the entity designated to receive beacon information.

In some embodiments, the method includes determining characteristics of the received radio-frequency transmission which indicate the operational status of the emergency locator beacon, and generating the report message to include information indicating the operational status of the emergency locator beacon.

In some embodiments, the beacon registration information includes a user-designated message to include in the report message. For example, the user-designated message may be "Self Test Successful" or "I'm Okay" or "Come and get me" or "I'm on my way home."

In some embodiments, the method includes determining a location of the emergency locator beacon based on the radio-frequency transmission, and generating the report message to include information indicating the location of the emergency locator beacon that generated the transmission. The location of the emergency locator beacon may be based on GPS information included in the radio-frequency transmission, or the location may be based on a position of the emergency locator beacon with respect to a plurality of satellites of the satellite network.

In another preferred embodiment, a method for testing emergency locator beacons includes the following steps:
(a) receiving beacon test data from a beacon tester via a communication network, where the beacon test data includes a beacon identification number associated with an emergency locator beacon that has been activated in a self-test mode to generate a radio-frequency transmission in close proximity to the beacon tester;
(b) receiving the radio-frequency transmission from the emergency locator beacon via a satellite network, where the radio-frequency transmission includes the beacon identification number;
(c) determining whether the beacon identification number from the beacon test data matches the beacon identification number from the radio-frequency transmission received via the satellite network;
(d) if the beacon identification number from the beacon test data matches the beacon identification number from the radio-frequency transmission received via the satellite network, determining characteristics of the radio-frequency transmission indicative of the operational status of the emergency locator beacon;
(e) generating a test report based on the characteristics determined in step (d); and
(f) communicating the test report via the communication network.

BRIEF DESCRIPTION OF THE DRAWINGS

Further advantages of the invention are apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
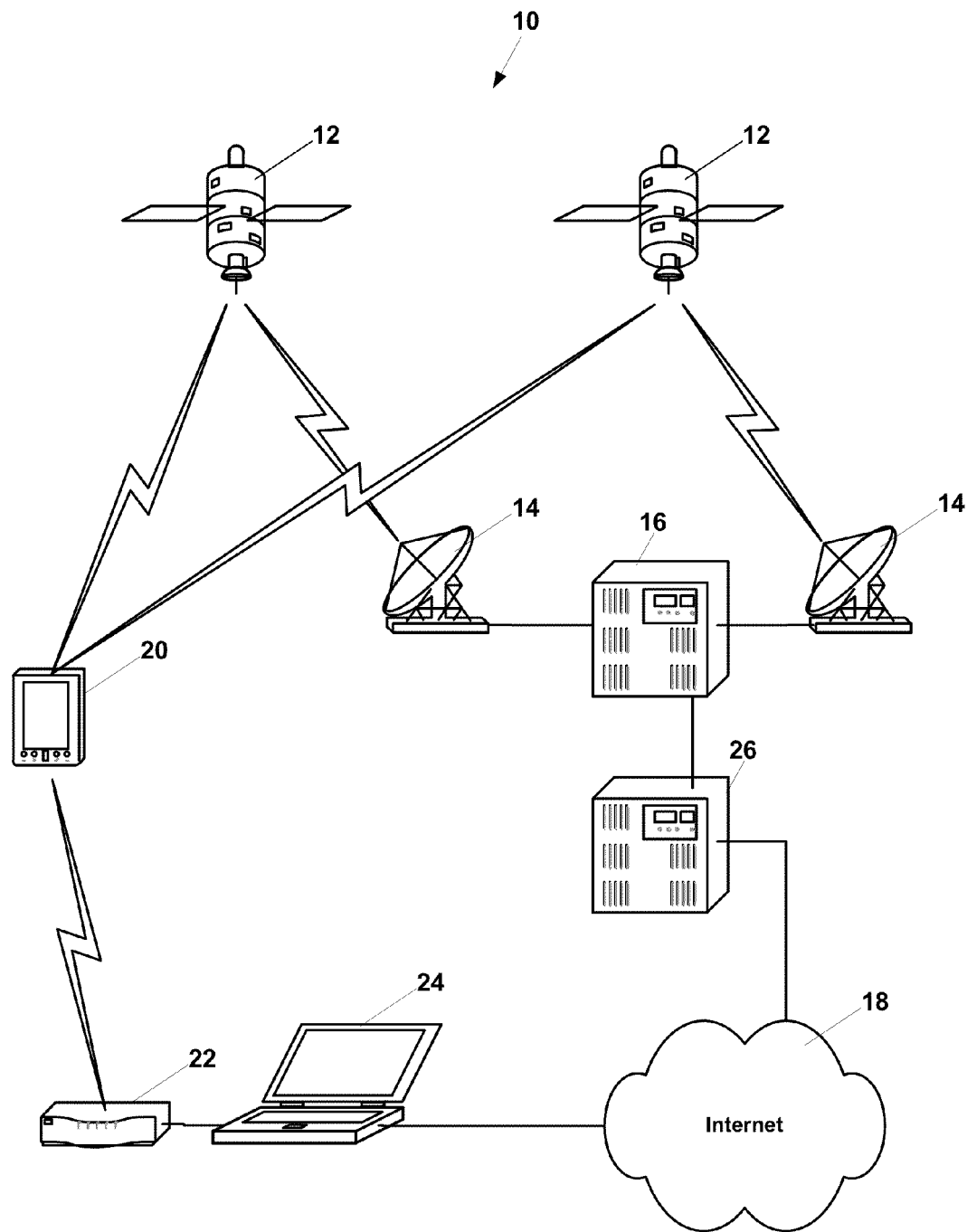
FIG. 1 depicts a preferred embodiment of an emergency locator beacon testing system.

As shown in FIG. 1, an emergency locator beacon testing system 10 includes satellites 12 that are components of the Cospas-Sarsat search-and-rescue satellite system. The satellites 12 are in wireless communication with local user terminals (LUTs) 14 which may be operated by a private monitoring service entity such as SafeLife Systems, a subsidiary of PROCON, Inc. of Knoxville, Tenn. The LUTs 14 are in communication with a beacon information processor 16, which also may be operated by the private monitoring service entity. The beacon information processor 16 is connected to a web server 26 which is connected to a global communication network 18, such as the Internet.

Each LUT 14 executes software that continuously monitors the downlink from the Cospas-Sarsat satellites 12 to detect beacon signals at 406 MHz. The LUT software (1) demodulates the beacon signals to form a binary message, (2) performs error checks and if necessary corrects the binary message, (3) decodes the binary message according to Cospas-Sarsat protocols, (4) formats the decoded data into a 36-bit hexadecimal message, and (5) creates an ASCII message based thereon. In preferred embodiments, the ASCII message includes the complete 36-bit hexadecimal message and other information decoded from the binary data. A UIN that is unique to each beacon is imbedded in the ASCII message forwarded to the beacon information processor 16 from the LUT 14. Software running on the LUT 14 also preferably includes system operations and management tools for performance monitoring and troubleshooting of the system components. Each LUT 14 can be remotely monitored and controlled using these tools.

Figure 4:
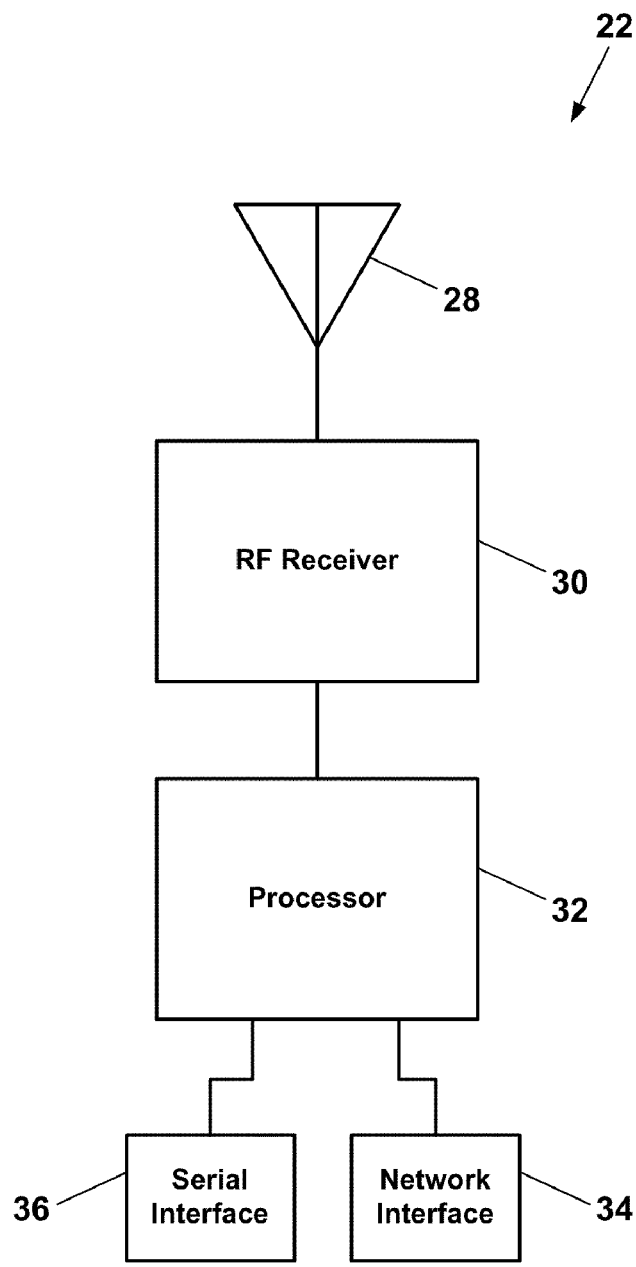
FIG. 4 depicts a functional block diagram of a close-proximity beacon tester.

Some embodiments of the system 10 include a close-proximity beacon tester 22. As shown in FIG. 4, an embodiment of the beacon tester 22 includes an antenna 28 that receives a beacon signal transmitted from an emergency locator beacon unit 20 that is in relatively close proximity to the beacon tester 22. The beacon tester 22 includes at least one RF receiver 30 operable to receive beacon signals at 406 MHz, and optionally 243 MHz and/or 121.5 MHz. The receiver 30 demodulates the beacon signals and extracts binary beacon information, such as the beacon UIN. In some embodiments, the receiver 30 may also extract various other characteristics of the received beacon signal, such as frequency, power and modulation characteristics. The binary beacon information is provided to a processor 32 which processes the beacon information to form 36-bit hexadecimal messages. The beacon tester 22 preferably includes a serial data interface 36, such as a USB interface, which may be used to transfer beacon data to an external computer for further processing. In some embodiments, the beacon tester 22 includes a local area network interface 36 which allows for direct connection of the beacon tester 22 to a local network and to the Internet.

With reference to FIG. 1, the system 10 may include a computer 24, such as a laptop computer, notebook computer, personal digital assistant (PDA) or desktop computer, which is connected to the global communication network 18. Software running on the computer 24 receives the beacon signal characteristic data provided by the close-proximity beacon tester 22 and forwards this data via the Internet 18 to the beacon information processor 16. In preferred embodiments, the software on the computer 24 receives 36-bit hexadecimal messages from the close-proximity beacon tester 22, decodes the 36-bit hexadecimal messages back to binary format, and decodes the binary data according to Cospas-Sarsat protocols to produce test result information. The extracted information is preferably packaged into an ASCII message. The UIN that is unique to each beacon is embedded in the ASCII message that is forwarded to the beacon information processor 16.

It will be appreciated that the processing of the beacon data performed by the computer 24 may instead be performed by the processor 32 of the beacon tester 22, and that the ASCII message containing the beacon information may be transferred directly from the beacon tester 22 via the network 18 to the beacon information processor 16. In such an embodiment, there is no need for the computer 24.

The beacon information processor 16 executes software that manages all incoming and outgoing data messages. In preferred embodiments, a database associated with the beacon information processor 16 is the repository for all information received from the LUTs 14 and/or the close-proximity beacon tester 22. Software executed on the beacon information processor 16 records all messages received and searches the database for a match on the received UIN. If a match is found, the corresponding client record is retrieved and updated with the new information contained in the message. This new information is also forwarded to a web server 26 for access and viewing by the client via the Internet 18.

The web server 26 executes software to operate a web site where clients may log in via the Internet 18 to view and/or update client account information. The software on the web server 26 also includes a communications component that uses email and/or Short Messaging Service (SMS) protocol to send report messages to the clients pertaining to account activity and beacon usage.

Table I below provides an example of beacon signal characteristic data that may be provided by the close-proximity beacon tester 22. Some embodiments of the close-proximity beacon tester 22 may not provide all of the listed data.

TABLE I

| Beacon Characteristic | Reported Value: |
|---|---|
| UIN | 2DCE5800B6FFBFF |
| Organization: | PROCON |
| Tested By: | R.D. Bishop |
| Date: | 2/26/08 2:35:46 PM/PST |
| Tester Model/Serial No./File Name: | SLS200/2637/Test_file_1 |
| Tester Cal Due Date: | Dec. 3, 2009 |
| Tester Temperature: | 29° C. |
| 15 Hex ID: | 2DCE5800B6FFBFF |
| Full Hex: | FFFED096E72C005B7FDFF906B2F783E0F66C |
| Burst Mode: | Self Test Mode (Long) |
| Protocol: | PLB Serial SLP Protocol |
| Country 366: | United States |
| C/S Approval #: | 176 |
| Serial Number: | 91 |
| Position Source: | Internal GPS |
| Auxiliary Radio: | 121.5 MHz |
| Bits 107-110: | Default |
| Latitude: | *.°.** |
| Longitude: | *.°.** |
| 406 Frequency (INT REF): | 406.0281 MHz |
| 406 Power (INT ANT): | 89% |
| Power Rise Time: | <5 ms |
| Phase Deviation: | −1.09 + 1.07 radians |
| Modulation Rise Time: | 188 uS |
| Modulation Fall Time: | 177 uS |
| Modulation Symmetry: | 1.2% |
| Modulation Bit Rate: | 399.5 bps |
| 121 Frequency (INT REF): | 121.5006 MHz |
| 121 Power (INT ANT): | 63% |

Figure 2:
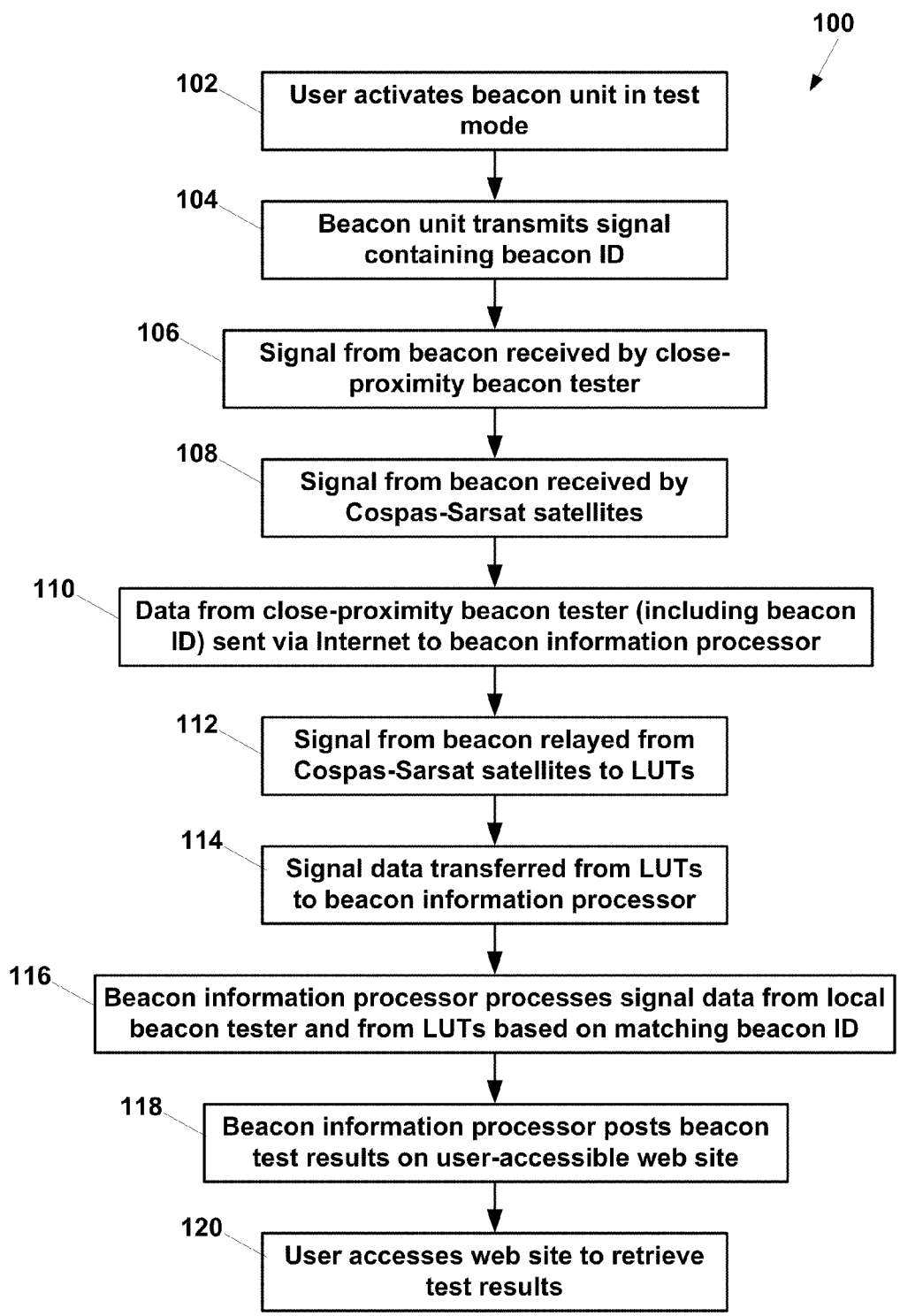
FIG. 2 depicts steps of a method for testing emergency locator beacons according to a first embodiment.

With reference to FIGS. 1 and 2, a first embodiment of an automated beacon test process 100 will be described. When the beacon unit 20 is activated in a test mode (step 100), the beacon unit 20 transmits an Inverted Frame Sync (IFS) signal containing the beacon unit's UIN (step 104). The IFS signal is received by the close-proximity beacon tester 22 (step 106) and by one or more of the Cospas-Sarsat satellites 12 (step 108). The computer 24 collects the IFS signal data from the close-proximity beacon tester 22 and sends the data via the Internet 18 to the beacon information processor 16 for processing (step 110).

Substantially at the same time, the IFS signal data received by the Cospas-Sarsat satellites is relayed to one or more of the LUTs 14 (step 112) which provides the data to the beacon information processor 16 (step 114). The beacon information processor 16 receives the IFS signal data from the LUTs 14 and from the beacon tester 22, and matches the beacon UIN from the two different data sources. The beacon information processor 16 then processes the IFS signal data and generates a report message, such as a test report (step 116). The test report is then posted on a beacon testing website (step 118) where it can be accessed by the entity who initiated the test (step 120) or by another entity designated to receive beacon information. One of the options provided on the website is the ability to print a beacon test certificate that will be valid proof to government entities of proper operation of the beacon unit 20.

Although the method of FIG. 2 could be performed by individual owners of beacon units, its most advantageous application would be for businesses which provide beacon testing services, such as at a marina, airport, or beacon manufacturer. To accommodate this application, each close-proximity beacon tester 22 may have a unique identification number stored in its memory. In some embodiments, this beacon tester ID is included in the data sent (in step 110) via the Internet 18 and the web server 26 to the beacon information processor 16 for processing. When the beacon test report is posted (step 118), it may be accessed by the beacon testing service (step 120) which may provide the report to its customer (beacon owner) along with a beacon test certificate.

Figure 3:
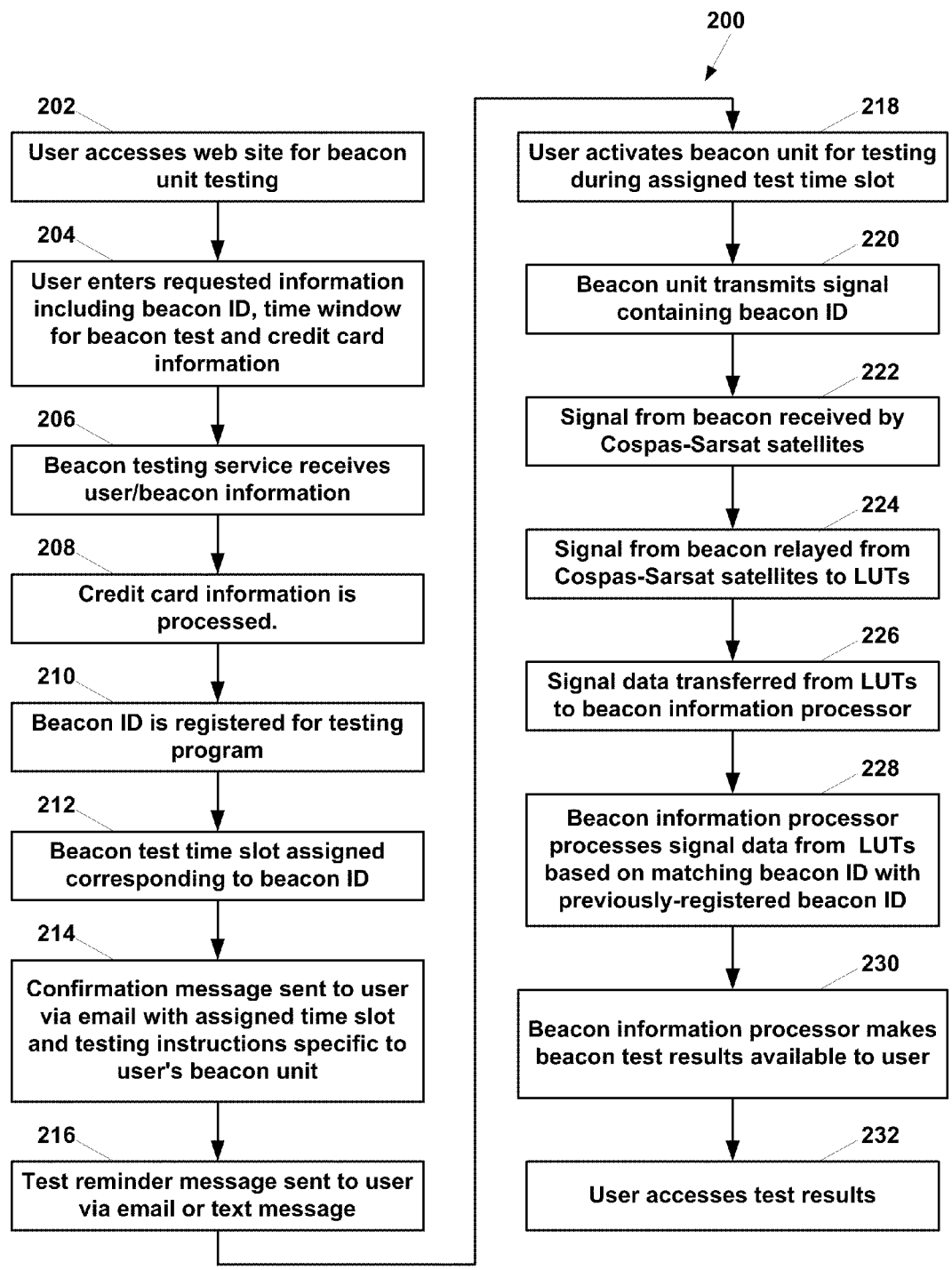
FIG. 3 depicts steps of a method for testing emergency locator beacons according to a second embodiment.

FIG. 3 depicts a second embodiment of an automated beacon test process 200 which does not require the close-proximity beacon tester 22. As compared to the process of FIG. 2, this process may be more applicable to individual beacon owners. In the process of FIG. 3, a user wishing to test a beacon unit or otherwise use the beacon for communication purposes may access a beacon testing website via the Internet 18 (step 202) and enters a request for testing. On the website, the user typically enters some or all of the following information as part of the request (step 204):

Name of entity requesting beacon test or name of entity designated to receive beacon information (which may be an entity other than the entity requesting the test);
  Email address of entity requesting beacon test or of entity designated to receive beacon information;
  15-digit Unique Identifier Number (UIN) of the beacon unit to be tested;
  Proposed location at which the beacon unit will be tested;
  Fax number of entity requesting beacon test or of entity designated to receive beacon information;
  Cell phone number of entity requesting beacon test or of entity designated to receive beacon information (for receiving SMS messages with test results);
  Credit card billing information;
  Type of beacon to be tested (ELT, PLB, EPIRB, other); and
  Time window (i.e., one hour) during which test will be performed.

The above information is received by the beacon testing service (step 206) which processes the user's credit card information (step 208) and registers the beacon unit's UIN in a beacon monitoring program database associated with the beacon information processor 16 (step 210). In some embodiments of the method, a selected beacon test time window is also entered in the database in association with the beacon unit's UIN (step 212), and an alert queue is created corresponding to the selected time window and UIN. A confirmation message which provides confirmation of the test time window is then sent via email to the user (step 214) and/or to another entity designated to receive beacon information. The confirmation email may also provide detailed instructions, preferably with illustrations pertaining to the procedure for activating the specific beacon unit to be tested. At the beginning of the designated test time window, a reminder email message, and optionally an SMS cell phone text message, is sent to the user instructing the user to activate the beacon in the self-test mode (step 216).

Some embodiments of the method do not incorporate a designated test time window. In these embodiments, the user may conduct the beacon test at any time.

At some point during the test time window (or at any time if no test time is assigned), the user activates the beacon unit 20 according to the self-test activation instructions (step 218). For example, most modern beacon units include a self-test button which when pressed causes the beacon unit to be activated in the self-test mode and transmit a signal encoded to indicate that it is a self-test signal. According to Cospas-Sarsat protocol, a self-test signal—or any other signal that is to be ignored by standard LUTs—is indicated by transmitting an Inverted Frame Synchronization (IFS) pattern in bits 16-24 of the message ("011010000"). In addition, Test Protocols transmitted using Normal Frame Synchronization in bits 16-24 and indicated by setting bits 37-39 of the message string to "111" are also ignored by the standard Cospas-Sarsat message decoding/processing software.

The beacon unit 20 then transmits the self-test signal containing its beacon UIN (step 220) which is received by one or more of the Cospas-Sarsat satellites 12 (step 222). The self-test signal is relayed from one or more of the satellites 12 to one or more of the LUTs 14 (step 224) and then transferred to the beacon information processor 16 (step 226). Although the self-test signal is ignored by normal LUTs within the Cospas-Sarsat system (based on detection of the IFS message), the LUTs 14 and the beacon information processor 16 recognize it as a self-test signal (as opposed to an actual emergency signal) and process the self-test signal accordingly (step 228).

A beacon report message, which may be a beacon test report, is then posted on the beacon testing website where it can be accessed by the user or another entity designated to receive beacon information, or the report message is emailed to the user or other designated entity (step 230). In this case, the report message may include:
confirmation that the correct UIN was received;
confirmation of one or more separate bursts transmitted;
exact frequency (i.e., 406.000 MHz) of the beacon transmission;
signal-to-noise ratio of the beacon transmission;
date and time of the test session and of each of the bursts; and
a message such as "Self Test Successful" or other message selected by the user.

As with the first method described above, the user also preferably has the ability to print a beacon test certificate that will be valid proof to government entities of proper operation of the beacon unit 20.

In embodiments that incorporate a test time window, if no beacon signal containing the registered UIN is received during the allotted time window, a report message is posted on the beacon testing website indicating that the test failed because no beacon signal was received. If no beacon signal was received, it could be because (1) the beacon was faulty or (2) the user failed to activate the beacon to transmit during the allotted time period or (3) the user activated the beacon incorrectly (e.g. indoors or without the antenna erected) or (4) the registered UIN is incorrect or was incorrectly entered into the website database. The report message preferably provides information that addresses each situation. For example, the report message may provide instructions for the user to follow to schedule another time for testing the beacon and instructions on how to correctly carry out the test to optimize the chances of success. The report message may also provide information about service providers to which the user may take or send the beacon for professional testing and repair.

If a normal emergency alert signal is received during a test period, as opposed to a self-test signal, a notice is provided to the user or other designated entity indicating that the beacon may have unintentionally triggered an emergency alert instead of a self test. This signal will otherwise be treated by the Cospas-Sarsat system as a standard emergency signal.

If a message protocol received by the LUTs 14 corresponds to an Orbitography protocol or a test protocol or an IFS Self Test message protocol, the system preferably processes the received message as it would an actual emergency transmission.

As described above, when the system 10 is used for testing an emergency locator beacon, the report message preferably includes the phrase "Self Test Successful" or some similar language to indicate a successful test. It will be appreciated that the system 10 may also be used to communicate information from a beacon user to another entity designated to receive beacon information.

For example, the beacon user may be a husband going off on a hunting trip into a remote area for a few days where regular communication options, such as cellular telephone, are not available. Although he plans to take his emergency locator beacon with him and he assures his wife that in the event of an emergency he will activate the beacon to summon rescue services, his wife is concerned that he might fall and become unconscious and thus be unable to activate the beacon. To alleviate this concern, the husband arranges to perform a self test on the beacon at a prearranged time (the allocated time slot) and for the "Self Test Successful" message to be sent to the wife's cell phone as an SMS text message. In this way, the wife will know the husband is okay when she receives the text message during the allocated time slot. If she does not receive the message during the allotted time, then the wife may take appropriate action, such as calling a friend to drive up to where the husband is hunting or letting the park ranger service know about the situation.

To use the system 10 for communicating according to this example, the beacon registration information stored in the beacon database should be updated to include the wife's cell phone number in the contact information. Also, the husband and wife must make prearrangements regarding the details of the timing of the transmission and what the message means, and of course the husband must remember to actually perform the self test on his beacon at the agreed time. Some embodiments of the invention allow for updating the beacon registration information to customize the textual phrase that will be included in the beacon report message. In these embodiments, the beacon user may choose this phrase to be "I'm Okay" or "Come and get me" or "I'm on my way home" or some other message.

When the system 10 is used for communicating information to a designated entity, it is not necessary to allocate a time slot for the beacon transmission. For example, if no time slot is allocated, any message received by the designated entity at any time may be prearranged to mean "Please come pick me up from the camp site when you get this message." Alternatively, it could be prearranged that the message means something different based upon the time of day it is sent. For example, if a message is sent between 9-10 AM, it means "I am coming home today," and if it is sent between 10-11 AM, it means "I am coming home tomorrow," etc. The user could also use the system 10 to send more than one message. For example, while out on the hunting trip, the husband may send his wife an "I'm Okay" message every day at an agreed time.

The system 10 may also be used to track an emergency locator beacon. To fully appreciate how the system 10 may be used for beacon tracking, one should understand the different types of satellites 12 included in the system 10. Currently there are three types of satellites used in the Cospas-Sarsat network: Low Earth Orbiting Satellites (LEOs), Medium Earth Orbiting Satellites (MEOs) and Geostationary Satellites (GEOs). Each of these three types of satellites requires their own dedicated ground receiving stations (Local User Terminals (LUTs)) respectively called LEOLUTs, MEOLUTs and GEOLUTs.

Under normal circumstances, the GEOs are in geostationary orbit above the earth and thus do not move position in relationship to the earth. Thus, there is no way to extract location information from the GEOs. With the GEOs, the only way to obtain the location of an emergency beacon is to encode its location into the message that is transmitted from the beacon to the GEOs. This is usually achieved using the Global Positioning Satellite (GPS) system by embedding a GPS receiver within the emergency locator beacon and including the position (latitude and longitude) that it provides in the message transmitted from the beacon. However, when first turned on these receivers take a considerable amount of time to obtain a position, and they draw a considerable amount of power. Thus, GPS receivers are not ideal for use in the normal "self test" mode of beacon operation. However, there is a special beacon mode called a "GPS Self Test" that does include the beacon's location in the transmitted self test message which can be picked up and decoded by the system 10. At this time, only the very latest models of beacons have this facility and it usually takes about five minutes to obtain a position and run a GPS Self Test. Due to battery life considerations, the number of these tests that can be carried out over the life of the beacon is usually limited.

Having LEOLUTs and/or MEOLUTs within the system 10 provides the ability to determine the approximate location of an emergency beacon by other means without the use of GPS. Since the LEO satellites move across the sky quite quickly, the LEOLUTs may use the Doppler shift principle to calculate the location of the beacon on the earth's surface based on the known locations of the satellites and the measured Doppler shift in the frequency of the beacon's transmission. Generally this technique works best when the location is computed using a number of bursts from the beacon.

MEOLUTs use a totally different principle to calculate the location of the beacon on the earth's surface. MEOLUTs use the Time Of Arrival (TOA) principle and a number of MEO satellites to calculate the position of the beacon by triangulation. This is in effect exactly the way that GPS works, but in reverse. This system needs only one burst from the beacon in order to compute the beacon's location. However, the beacon must be able to "see" at least three MEO satellites (and ideally four) at the same time, and all of the visible MEO satellites must be linked to their own MEOLUT.

In summary, by using either the "GPS Self Test" feature available in some modern emergency locator beacons, or by including LEOLUTs or MEOLUTs in the system 10 and using the standard self test feature, it would be possible to obtain the approximate location of the beacon being tested. Location accuracy would depend on the system being used and the number of transmissions and satellites used. Thus, accuracy could range from a best case of about 300 feet to a worst case of about 10 miles.

If using a modern beacon with the "GPS Self Test" facility, it is possible to check that the GPS Receiver in the beacon is working correctly, that it is encoding location data into the beacon transmission, that the beacon transmission is received and decoded by the satellites and LUTs, and that the indicated location corresponds to the actual location of the beacon when the test was performed.

No matter how the location information is made available, if the beacon self test is used to communicate a message to a designated entity (such as the "I'm Okay" example), the location information can also indicate to the designated entity approximately where the beacon was located when the self test was performed. Further, by making several beacon transmissions over a period of time, it is possible to leave a "breadcrumb trail" showing where the beacon has been.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method for communicating information using an emergency locator beacon, the method comprising:
   (a) receiving beacon registration information via a communication network, the beacon registration information including a beacon identification number associated with the emergency locator beacon and contact information associated with an entity designated to receive beacon information;
   (b) storing the beacon registration information in a database;
   (c) receiving a radio-frequency transmission from an emergency locator beacon via a satellite network, the radio-frequency transmission including a beacon identification number;
   (d) extracting the beacon identification number from the radio-frequency transmission;
   (e) searching the database to find beacon registration information associated with the beacon identification number extracted from the radio-frequency transmission;
   (f) generating a report message for the entity designated to receive beacon information identified by the contact information included in the beacon registration information found in step (e), the report message including beacon information obtained from the radio-frequency transmission; and
   (g) communicating the report message via a communication network to the entity designated to receive beacon information.

2. The method of claim 1 further comprising:
   determining characteristics of the radio-frequency transmission received in step (c), said characteristics indicative of the operational status of the emergency locator beacon that generated the transmission; and step (f) including generating the report message including information indicating the operational status of the emergency locator beacon that generated the transmission.

3. The method of claim 1 further comprising:
(h) prior to step (c), allocating a time slot during which the emergency locator beacon is to be operated to generate the radio-frequency transmission received in step (c);
(i) prior to step (c), storing the allocated time slot in the database in association with the beacon registration information; and
(j) prior to step (c), communicating the allocated time slot via the communication network to the entity designated to receive beacon information,
wherein step (c) comprises receiving the radio-frequency transmission from the emergency locator beacon via the satellite network during the allocated time slot.

4. The method of claim 3 wherein step (j) further comprises initially sending the entity a confirmation communication, and later sending the entity a reminder communication to remind the entity of the upcoming allocated time slot during which the emergency locator beacon is to be operated.

5. The method of claim 1 further comprising:
(h) accessing the contact information included in the beacon registration information found in step (e); and
(i) notifying the entity identified in the contact information regarding availability of the report message via a communication path indicated in the contact information, wherein the communication path is selected from the group consisting of at least one of electronic mail, text message, facsimile and telephone call.

6. The method of claim 1 wherein step (g) comprises making the report message available via at least one of a webpage, electronic mail, text message, facsimile or telephone call.

7. The method of claim 1 further comprising:
(h) after step (c), extracting a message protocol from the radio-frequency transmission;
(i) determining whether the message protocol corresponds to a test protocol; and
(j) if the message protocol corresponds to a test protocol, proceeding with steps (d) through (g).

8. The method of claim 1 further comprising:
(h) after step (c), extracting a message protocol from the radio-frequency transmission;
(i) determining whether the message protocol corresponds to an Inverted Frame Sync (IFS) Self Test message; and
(j) if the message protocol corresponds to an IFS Self Test message, proceeding with steps (d) through (g).

9. The method of claim 1 further comprising:
(h) after step (c), extracting a message protocol from the radio-frequency transmission;
(i) determining whether the message protocol corresponds to an Orbitography protocol or a test protocol or an Inverted Frame Sync (IFS) Self Test message protocol; and
(j) if the message protocol does not correspond to an Orbitography protocol or a test protocol or an IFS Self Test message protocol, processing the radio-frequency transmission as an actual emergency transmission.

10. The method of claim 1 wherein step (a) comprises receiving the beacon registration information including a user-designated message to include in the report message.

11. The method of claim 10 wherein the user-designated message comprises "Self Test Successful" or "I'm Okay" or "Come and get me" or "I'm on my way home."

12. The method of claim 1 further comprising:
determining a location of the emergency locator beacon based on the radio-frequency transmission received in step (c); and
step (f) including generating the report message including information indicating the location of the emergency locator beacon that generated the transmission.

13. The method of claim 12 further comprising determining the location of the emergency locator beacon based on GPS information included in the radio-frequency transmission.

14. The method of claim 12 further comprising determining the location of the emergency locator beacon based on a position of the emergency locator beacon with respect to a plurality of satellites of the satellite network.

15. A system for testing an emergency locator beacon to verify proper operation and for providing test results, the system comprising:
a database for storing beacon registration information including a beacon identification number associated with the emergency locator beacon and user contact information associated with a designated user of the emergency locator beacon;
one or more local user terminals for receiving a radio-frequency transmission from an emergency locator beacon via a satellite network, wherein the radio-frequency transmission includes a beacon identification number;
one or more beacon information processors in communication with the one or more local user terminals and the database, the one or more beacon information processors for extracting the beacon identification number from the radio-frequency transmission, for searching the database to find beacon registration information associated with the beacon identification number extracted from the radio-frequency transmission, for determining characteristics of the radio-frequency transmission indicative of the operational status of the emergency locator beacon that generated the transmission, and for generating a test report based on the characteristics determined; and
a communication network for communicating the test report to the user.

16. The system of claim 15 wherein
the database is further for storing a time slot allocated for testing the emergency locator beacon, and
the one or more local user terminals are for receiving a radio-frequency transmission from the emergency locator beacon via the satellite network during the allocated time slot.

17. The system of claim 15 wherein the one or more beacon information processors access the user contact information associated with the beacon registration information and notify a user identified in the user contact information regarding availability of the test report via a communication path indicated in the user contact information, wherein the communication path is selected from the group consisting of electronic mail, text message, facsimile, and telephone call.

18. The system of claim 15 wherein the test report is communicated to the user via a webpage.

19. The system of claim 15 wherein one or more of the local user terminals or the beacon information processors extract a message protocol from the radio-frequency transmission, determine whether the message protocol corresponds to a test protocol or an Inverted Frame Sync (IFS) Self Test message protocol and, proceed with generation of the test report if the message protocol corresponds to a test protocol or an IFS Self Test message protocol.

20. The system of claim 15 wherein one or more of the local user terminals or the beacon information processors extract a message protocol from the radio-frequency transmission, determine whether the message protocol corresponds to a test protocol or an Orbitography protocol or an Inverted Frame Sync (IFS) Self Test message protocol, and process the radio-frequency transmission as an actual emergency transmission if the message protocol does not correspond to an Orbitography protocol or a test protocol or an IFS Self Test message protocol.

21. A method for testing emergency locator beacons to verify proper operation and for providing test results, the method comprising:
  (a) receiving beacon test data from a beacon tester via a communication network, the beacon test data including a beacon identification number associated with an emergency locator beacon that has been activated to generate a radio-frequency transmission in close proximity to the beacon tester;
  (b) receiving the radio-frequency transmission from the emergency locator beacon via a satellite network, the radio-frequency transmission including the beacon identification number;
  (c) determining whether the beacon identification number from the beacon test data matches the beacon identification number from the radio-frequency transmission received via the satellite network;
  (d) if the beacon identification number from the beacon test data matches the beacon identification number from the radio-frequency transmission received via the satellite network, determining characteristics of the radio-frequency transmission indicative of the operational status of the emergency locator beacon;
  (e) generating a test report based on the characteristics determined in step (d); and
  (f) communicating the test report via the communication network.

22. The method of claim 21 further comprising:
  (g) accessing user identification information from the beacon tester data;
  (h) accessing a database to determine user contact information associated with the user identification information; and
  (i) notifying a user identified in the user identification information regarding availability of the test report via a communication path indicated in the user contact information, wherein the communication path is selected from the group consisting of electronic mail, text message, facsimile, and telephone call.

23. The method of claim 21 wherein step (f) comprises making the test report available via a webpage.

24. The method of claim 21 further comprising generating a beacon test certificate.

25. The method of claim 21 further comprising:
  (h) after step (b), extracting a message protocol from the radio-frequency transmission received via the satellite network;
  (i) determining whether the message protocol corresponds to a test protocol; and
  (j) if the message protocol corresponds to a test protocol, proceeding with steps (c) through (f).

26. The method of claim 21 further comprising:
  (h) after step (b), extracting a message protocol from the radio-frequency transmission received via the satellite network;
  (i) determining whether the message protocol corresponds to an Orbitography protocol or a test protocol; and
  (j) if the message protocol does not correspond to an Orbitography protocol or a test protocol, processing the radio-frequency transmission as an actual emergency transmission.

27. A system for communicating information using an emergency locator beacon, the system comprising:
  a database for storing beacon registration information including a beacon identification number associated with the emergency locator beacon and contact information associated with an entity designated to receive beacon information;
  one or more local user terminals for receiving a radio-frequency transmission from an emergency locator beacon via a satellite network, wherein the radio-frequency transmission includes a beacon identification number;
  one or more beacon information processors in communication with the one or more local user terminals and the database, the one or more beacon information processors for extracting the beacon identification number from the radio-frequency transmission, for searching the database to find beacon registration information associated with the beacon identification number extracted from the radio-frequency transmission, and for generating a report message for the entity designated to receive beacon information, the report message including beacon information obtained from the radio-frequency transmission; and
  a communication network for communicating the report message to the entity designated to receive beacon information.

28. The system of claim 27 wherein
  the database is further for storing a time slot allocated for operation of the emergency locator beacon to generate a radio-frequency transmission, and
  the one or more local user terminals are for receiving a radio-frequency transmission from the emergency locator beacon via the satellite network during the allocated time slot.

29. The system of claim 27 wherein the one or more beacon information processors access the contact information included in the beacon registration information and notify the entity identified in the contact information regarding availability of the report message via a communication path indicated in the contact information, wherein the communication path is selected from the group consisting of at least one of electronic mail, text message, facsimile, and telephone call.

30. The system of claim 27 wherein the report message is communicated to the user via a webpage.

31. The system of claim 27 wherein one or more of the local user terminals or the beacon information processors extract a message protocol from the radio-frequency transmission, determine whether the message protocol corresponds to a test protocol or an Orbitography protocol or an Inverted Frame Sync (IFS) Self Test message protocol, and proceed with generation of the report message if the message protocol corresponds to a test protocol or an Orbitography protocol or an IFS Self Test message protocol.

32. The system of claim 27 wherein one or more of the local user terminals or the beacon information processors extract a message protocol from the radio-frequency transmission, determine whether the message protocol corresponds to a test protocol or an Orbitography protocol or an Inverted Frame Sync (IFS) Self Test message protocol, and process the radio-frequency transmission as an actual emergency transmission if the message protocol does not correspond to an Orbitography protocol or a test protocol or an IFS Self Test message protocol.

33. The system of claim 27 wherein the database is for storing beacon registration information including a user-designated message to include in the report message.

34. The system of claim 33 wherein the user-designated message comprises "Self Test Successful" or "I'm Okay" or "Come and get me" or "I'm on my way home."

* * * * *